United States Patent [19]

Divisek et al.

[11] 4,338,167

[45] Jul. 6, 1982

[54] METHOD FOR INCREASING ELECTROLYTIC EFFICIENCY OF A FUSION ELECTROLYSIS WITH ANODIC OXYGEN GENERATION

[75] Inventors: Jiri Divisek; Jürgen Mergel; Frans G. Bodewig, all of Julich, Fed. Rep. of Germany

[73] Assignee: Kernforschungsanlage Jülich Gesellschaft mit beschränkter Haftung, Jülich, Fed. Rep. of Germany

[21] Appl. No.: 248,319

[22] Filed: Mar. 27, 1981

Related U.S. Application Data

[63] Continuation-in-part of Ser. No. 107,591, Dec. 27, 1979, abandoned.

[30] Foreign Application Priority Data

Dec. 27, 1978 [DE] Fed. Rep. of Germany ....... 2856276

[51] Int. Cl.³ .......................... C25B 1/04; C25B 1/10

[52] U.S. Cl. ................................................ 204/60
[58] Field of Search .................................. 204/60, 129

[56] References Cited

U.S. PATENT DOCUMENTS

| 3,173,849 | 3/1965 | Shearer et al. | 204/60 |
| 3,577,329 | 4/1971 | Shalit | 204/60 |
| 3,835,019 | 9/1974 | Lovelock | 204/60 |

Primary Examiner—Howard S. Williams
Attorney, Agent, or Firm—Becker & Becker, Inc.

[57] ABSTRACT

A method for increasing the current yield or electrolytic efficiency of a fusion electrolysis, especially water electrolysis, with which an anodic oxygen separation occurs. Lithium ions are added to the fusion electrolyte. Such lithium ions may be added by adding lithium as hydroxide or fluoride, sulfate or carbonate. The lithium addition amounts to at least 15 Mol % of the melt. Electrolyte is formed by a lithium hydroxide containing alkali hydroxide melt.

9 Claims, 2 Drawing Figures

METHOD FOR INCREASING ELECTROLYTIC EFFICIENCY OF A FUSION ELECTROLYSIS WITH ANODIC OXYGEN GENERATION

This is a Continuation-In-Part of co-pending application Ser. No. 107,591-Divisek et al filed Dec. 27, 1979 now abandoned.

The present invention relates to a method for increasing the current yield or electrolytic efficiency of a fusion electrolysis, especially for electrolysis of water, with which an anodic oxygen separation occurs.

Fusion electrolysis is especially advantageous for certain large technical methods, and especially for the decomposition of water accompanied by the recovery of hydrogen. Accordingly, a method for technical production of hydrogen and oxygen is already known, according to which a vapor containing sodium hydroxide (caustic soda) melt is subjected to electrolysis with high current densities. In this manner, voltage losses, which are considerable with the water decomposition at low temperatures in aqueous systems, are extensively eliminated, so that this method appears especially advantageous energy-wise.

The considerable thermodynamic and kinetic advantages, which are connected with a fusion electrolysis of water in the hydroxide melt, should also however, be utilized already for a modern recovery of hydrogen, about which a report was made by F. Behr, R. Schulten and H. Wenzl at the Second World Hydrogen Energy Conference in Zürich, (Switzerland) from the 21st until the 25th of August 1978. With this hybrid process, steam is electrolytically split in a hydroxide melt, though not being directly released or freed, but rather being recovered as an end product by a hybrid process. Both with the known water decomposition in the sodium hydroxide melt, accompanied by separation of hydrogen and release, and also with the aforementioned outlined hybrid process, oxygen is anodically separated.

As could be determined by newer investigations, there must now be accepted a considerable loss of current yield or electrolytic efficiency with those forms of fusion electrolysis which are connected with the direct anodic oxygen generation. This reduction of yield or efficiency appears to be caused by the fact that the oxygen generation in such melts or fusion is coupled with a formation of peroxide compounds. Such anodically formed peroxides can reach the cathode freely, and at this location effect the reduction of yield or efficiency. The determined losses of the current yield or electrolytic efficiency amount to at least 10% in the sodium hydroxide melt for example, and the losses are even higher in a potassium hydroxide melt.

Also in mixed salt systems, which contain sodium hydroxide or potassium hydroxide as a working component, this disadvantageous effect arises.

Aside from the aforementioned reduction of current yield or electrolysis efficiency reduction occurring with peroxide formation, the fusion electrolysis of the type mentioned have a further drawback that a quite considerable thermochemical disadvantageous delivery, output or emission of steam occurs into the product gas, which can reduce the efficiency of such systems in a measure not to be disregarded.

This drawback is noted also with the recovery of hydrogen by electrolytic water decomposition in the alkali melt according to German Patent Application Pat. No. 27 56 569.1-41 dated Dec. 19, 1977 and corresponding to U.S. patent application Ser. No. 972,344-Divisek et al, filed Dec. 22, 1978, now U.S. Pat. No. 4,225,401-Divisek et al issued Sept. 30, 1980, belonging to the assignee of the present invention, according to which the electrode chambers are separated from each other by a solid material electrolyte membrane of $\beta$-$Al_2O_3$, as a result of which the current yield or electrolytic efficiency is increased.

It is an object of the present invention to increase the current yield or electrolytic efficiency of such fusion electrolysis with anodic oxygen development in a simple manner, and additionally to reduce the water output with the product gas.

These and other objects and advantages of the present invention will appear more clearly from the following specification in connection with the accompanying drawings and examples.

IN THE DRAWINGS

Figure 1:
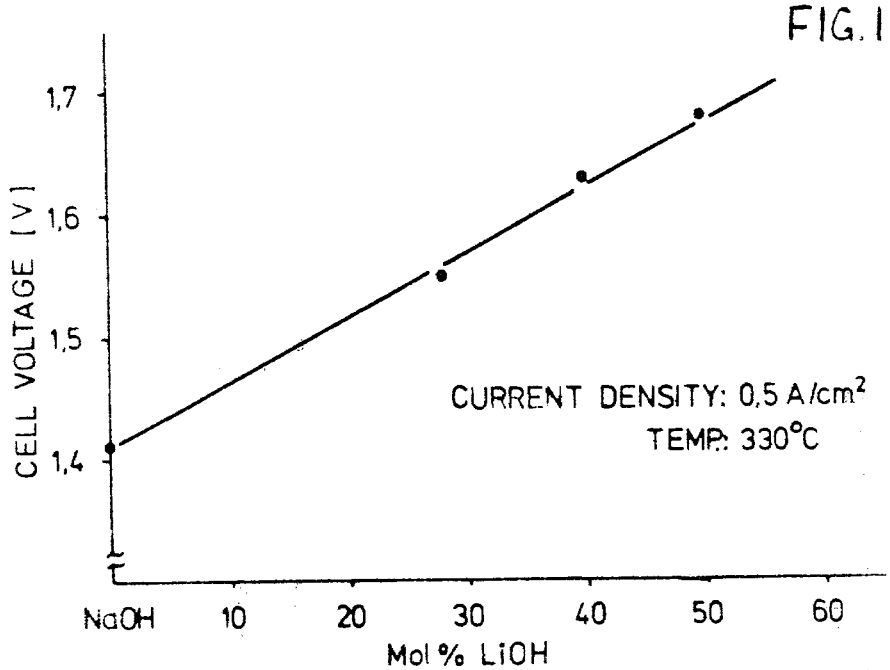
FIG. 1 shows a graphical representation of the change of cell voltage as a function of melt composition at atmospheric pressure.

The inventive fusion electrolysis method of the aforementioned type is accordingly characterized in that lithium ions are added to the fusion electrolyte.

These lithium ions are preferable introduced into the melt as hydroxide, or in the form of salt such as fluoride, sulfate or carbonate. For attaining more advantageous effects, the added lithium compound should amount to particularly at least 15 Mol % of the melt.

The present invention is still more understandable by referring to the following examples, which relate to fusion electrolysis of water, as especially set forth in the aforementioned German application belonging to the assignee of the present invention.

EXAMPLE 1

Steam was electrolyzed under normal pressure in a 1:1 (molecular) sodium hydroxide/lithium hydroxide melt at 400° C. A nickel plate was used as the electrode material both for the anode and also for the cathode. The steam was introduced into the melt through a separate steam conduit or line into the vicinity of the cathode. Both electrode chambers were separated from each other by a $\beta$-$Al_2O_3$-separator. The hydrogen or oxygen quantities produced by the electrolysis were analyzed gas-chromatographically, and the current yields or electrolysis efficiencies were calculated therefrom. With the electrolysis first carried out without lithium hydroxide addition, the current yield or electrolytic efficiency amounted to approximately 98% of the theoretical value. A current yield or electrolytic efficiency of practically 100% of theoretical was obtained by lithium hydroxide addition, with other conditions remaining identical.

In the product gas of the electrolysis cell, there was measured a (current density dependent) Mol relationship of $H_2O$ to $H_2$ of 20:1 without lithium hydroxide, or a ratio of 8:1 with lithium hydroxide, at a current density of 400 mA-$cm^2$.

EXAMPLE 2

Steam was electrolyzed under normal pressure in a hydroxide melt having a composition sodium hydroxide:lithium hydroxide=1:1 (NaOH:LiOH=1:1). Construction and dimensions of the cell were unchanged with respect to Example 1, though the $\beta$-Al$_2$O$_3$ partition or separating wall was left out between the anode chamber and the cathode chamber.

The current yield or electrolytic efficiency, measured as in Example 1, in this case, with lithium hydroxide, amounted to 98% in contrast to 90% (under identical conditions but without lithium hydroxide addition).

Similar values (as aforementioned) were obtained when the nickel cathode was replaced by a graphite cathode.

EXAMPLE 3

Under similar conditions as in Example 2, a test series was carried out with sodium hydroxide/lithium hydroxide mixtures with different lithium hydroxide portions (as electrolyte).

Under these circumstances, it was found that the current yield or electrolytic efficiency increases with an increasing lithium hydroxide portion, and, in particular, proceeding from 15 Mol% lithium hydroxide portion, about a 2% efficiency increase for every lithium hydroxide addition of 10 Mol%.

The preceding results show that the current yield or electrolytic efficiency can clearly be improved by addition of lithium ions, and that the water content in the gas is reduced considerably by lithium addition. Under these circumstances, already relatively small additions lead to an advantageous result, though the positive effect is even more strongly brought about by increasing the lithium portion. Standing in the way of a very high lithium content of the electrolytic melt are only the increased melting point brought about thereby and the higher price or cost or the lithium compounds in comparison to the sodium or potassium compounds.

The addition of the Li$^{30}$-ions to the fusion electrolyte according to the present invention generally represents an improvement by the addition of lithium hydroxide to alkali melts of a fusion electrolysis being subject or not to utilization of a $\beta$-Al$_2$O$_3$ separator between the anode and cathode.

Figure 2:
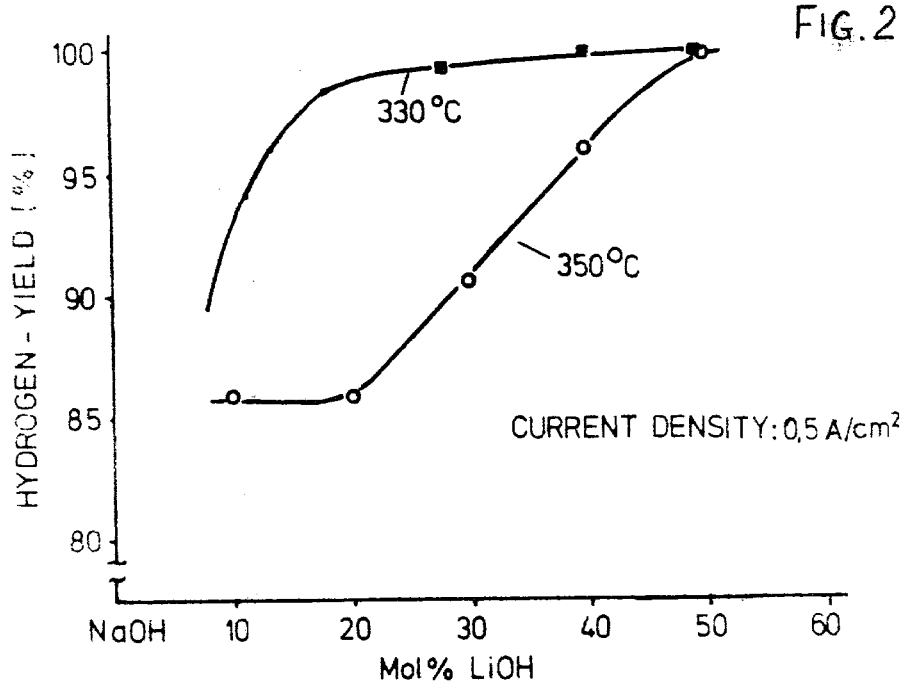
FIG. 2 shows a graphical representation of the current efficiency as a function of melt composition.

The graphs of FIGS. 1 and 2 refer to dependence of separation cell voltage or hydrogen yield based upon LiOH-concentration of the melt. Moreover, for a predetermined current density of the hydrogen separation, there is necessary an electrolysis voltage increase due to presence of Lithium ions in water-containing, aqueous or hydrous alkali melt, as apparent from the graph of FIG. 1.

FIG. 1 shows that for an electrolysis current density of 0.5 Amp/cm$^2$ there is considerable increase in the cell voltage necessary with increasing LiOH proportion in the melt. The electrolysis was carried out under atmospheric pressure and with steam or water-vapor partial pressures ranging from 400 to 500 Torr. The increase of electrolysis voltage with a Lithium ion proportion necessary for predetermined current density appears once initially as a sensitive deficiency which should deter an expert or average man skilled in the art seeking most economically feasible generation of hydrogen to stay away from utilization of a Lithium-ion-containing mixed melt.

Surprisingly, however, this deficiency is over-compensated thereby that the hydrogen yield of the electrolysis increases considerably with increasing Lithium ion proportion as apparent from the graph of FIG. 2.

FIG. 2 shows the hydrogen yield obtained at a predetermined prescribed current density of 0.5 Amp/cm$^2$, such hydrogen yield being dependent upon LiOH proportion of a sodium/Lithium hydroxide melt. Also, with this electrolysis, the water-vapor or steam partial pressure amounted to approximately 400 to 500 Torr with a melt-fusion electrolysis operated under atmospheric pressure. As apparent, a yield increase approximately up to 15% more can be attained whereby simultaneously, as found to be the case, there is considerable reduction of water content in the product gas. Consequently, there results collectively an advantage of the presence of Lithium ions which was not readily to be expected and which first could be established and proven on the basis of extensive investigation of the interrelationships.

The disclosure of U.S. Pat. Nos. 3,577,329-Shalit issued May 4, 1971 and 3,835,019-Lovelock issued Sept. 10, 1974 concern methods of electrolytic hydrogen transfer or hydrogen purification with which no oxygen is anodically developed, accordingly not providing any showing or suggestion whatever toward the present inventive increase in yield during electrolysis with anodic oxygen development.

The disclosure of U.S. Pat. No. 3,173,849-Shearer et al issued Mar. 16, 1965 concerns a special method for generation of pure oxygen gas with which a carbonate melt is electrolyzed whereby the anode-gas is brought together with the catholyte. Involved as carbonate melt under such circumstances are both lithium carbonate and also carbonates of the earth alkalis such as CaCO$_3$, MgCO$_3$, SrCO$_3$, and BaCO$_3$, while mixtures of alkali carbonates such as mixtures of Li$_2$CO$_3$, K$_2$CO$_3$, and Na$_2$CO$_3$ are designated as unsuitable (see column 3, line 74 through column 4, line 2 of U.S. Pat. No. 3,173,849-Shearer et al).

With this noted electrolytic gaining or obtaining of purest possible oxygen for a corresponding breathing atmosphere with which a carbonate melt is electrolyzed under special conditions the efficiency of the electrolysis has such a small or nominal meaning that in the entire Patent disclosure nothing is said about this point. Only on the basis of statements about the simultaneous formation of carbon, carbon oxide, and carbon dioxide is there indirectly ascertainable that the production yield relative to the stream or current flow certainly will not be at an optimum.

This U.S. Pat. No. 3,173,849-Shearer et al accordingly does not teach that by *additional* presence of lithium ions with a melt electrolysis with anodic oxygen development that an improvement in the production yield can be attained related to the stream or current flow. This recognition, in no way ascertainable from the state of the art, forms the basis of the present inventive method.

This means that the present invention differs from the state of the art both by setting of the object or goal (increase of the stream or current yield of a melt fusion electrolysis with anodic oxygen development according to the present invention compared to or relative to the known generation of pure oxygen from a carbonate melt, irrespective with which efficiency that is ever involved) as also by way of the undertaken measures of application of an electrolyte with lithium ion *addition* in a melt electrolysis which preferably (if also not exclusively) is formed by a hydroxide containing melt with water dissolved therein (a few percentage H$_2$O).

More specifically, the present invention can be considered as directed to melt fusion electrolysis in hydroxide containing melt. The main interest exists in the electrolysis of water in the form of a melt fusion electrolysis with which water dissolved in molten electrolyte is electrolyzed and for this reason this water electrolysis is noted as a preferred variation of the present inventive method. The present inventive teaching refers to a method whereby the electrolysis in cells, providing both a B-Al$_2$O$_3$-separating wall between the anode and cathode and also a LiOH/NaOH-mixture electrolyte, is to be precluded for the purpose of avoiding any conflict in the determining features for which patent protection is sought. The teaching of co-pending application Ser. No. 972,334, now U.S. Pat. No. 4,225,401-Divisek et al and the designated purpose to increase of the current yield should not be considered as included with the present invention.

In summary, the present method concerns current yield increase with melt fusion electrolysis with anodic oxygen development by presence of lithium ions presumably having a restrictive effect upon yield-reducing peroxide formation and moreover having an advantage that the water content in the product gas especially in the cathode gas is relatively small such that the present invention is not made obvious by methods with which only a hydrogen transfer occurs from the anode to the cathode without anodic oxygen being developed; also the present invention is not made obvious by any method for obtaining or regaining of purest possible oxygen from a carbonate melt of lithium carbonate, calcium carbonate, magnesium carbonate, strontium carbonate or barium carbonate with which the generated anode gas absolutely is to be brought together with catholyte.

Any attempt to consider that it would be possible to attain the teaching of the present invention since the addition of Lithium ions to fuse the electrolytes is generally known from the Shalit U.S. Pat. No. 3,577,329 and the Lovelock U.S. Pat. No. 3,835,019 seems to overlook and possibly disregard entirely the actual technical meaning of the present invention which is a teaching expressed thereby that the product yield of the electrolysis under otherwise identical conditions can be considerably improved and is improved thereby that Lithium ions are added to the electrolyte.

The aqueous electrolysis for generation of hydrogen in recent time has gained considerable technical meaning since hydrogen is taken into consideration as an energy carrier with the possible economical large scale technical generation thereof accordingly being the subject of extensive investigations.

Now in a surprising manner there has been found that solely by addition of Lithium ions under otherwise identical conditions an increase of the product yield can be attained which increases the economic feasibility of hydrogen gain and production yield even though during addition of Lithium ions for attaining an identical current flow higher cell voltages are necessary which conventionally is considered as disadvantageous and as reducing the efficiency of the electrolysis.

Generally the efforts are directed toward improvement of the economic feasibility of such electrolysis upon a reduction as far as possible for the inner resistence of the cell and accordingly the necessary electrolysis voltage. If now the influence of Lithium ions is considered in this view point, accordingly there is recognized as illustrated in FIG. 1 by an accompanying graph or illustration of a curve that the addition of Lithium ions leads to an increase or elevation of the necessary cell voltage accordingly at first having to be considered at one time as disadvantageous.

There has been determined that by way of the addition of Lithium ions there results simultaneously a considerable increase of the production yield which is so considerable, according to accompanying graph of FIG. 2, that consequently the necessary increase of the cell voltage for the same or identical electrolysis current is clearly over compensated and collectively a positive result is attained with a corresponding surprising and unexpected result.

This was completely unrecognized up until now and could not be ascertained from the literature which is concerned with aqueous electrolysis let alone then being ascertainable from the U.S. Pat. Nos. 3,577,329-Shalit and 3,835,019-Lovelock; Shalit discloses an electrolytic cleaning of hydrogen by a fusion electrolysis with which when using electrolyte aside from hydroxides of Lithium, sodium, potassium, cesium and rubidium (or mixtures of the same) there are to be used molten acid sulfates, phosphoric acid, acid sulfonate and bicarbonate and so forth.

The multiplicity of possibilities which results with the global proposal for mixture of hydroxides is quite considerable as is readily apparent. Lithium containing mixtures under such circumstances are not in any way emphasized as preferred. If a mixture at all is apparent from Shalit as being especially suitable, accordingly, such mixture must be considered to be that mixture mentioned in the examples as sodium hydroxide and potassium hydroxide.

This means that Shalit includes no showing or suggestion whatever as to the present inventive teaching.

The U.S. Pat. No. 3,835,019-Lovelock discloses the generation or separation of hydrogen-carrier gas with chromatographic work by electrolysis of water-containing alkali hydroxide mixtures whereby mixtures of Lithium hydroxide with sodium hydroxide or potassium hydroxide being preferred since in this manner low fusion temperatures of approximately 200° centigrade can be attained.

Also this teaching provides no showing or suggestion whatever as to the present inventive method for increasing the current yield of a melt-fusion electrolysis by Lithium ion addition with which the electrolysis temperature has no controlling meaning attributed thereto at all.

The fact that by admixing of Lithium hydroxide to potassium hydroxide or sodium hydroxide there can be attained melting or fusion point reductions must in no way lead an expert or average man skilled of the art thereto for applying or utilizing such additions or hydroxide mixtures in order to improve the efficiency of his electrolytic generation of hydrogen and oxygen in a fusion electrolysis.

In case an expert or average man skilled of the art even then tried out such mixtures without directive for reaching a goal, accordingly, the expert at first would have determined and established a clear increase of the cell voltage necessary for identical current densities and thereupon the expert doubtless would quickly have eliminated the Lithium addition again.

As further evidence of the novelty and inventive contribution of the present disclosure, there is respectfully pointed out that in West Germany there were considered German Auslegeschrift No. 14 71 795 (1) as well as German Offenlegungsschrift No. 19 58 359 (2). Of these, the reference (1) shows a fuel cell which contains as electrolyte a mixture of potassium chloride and/or Lithium chloride together with 0.1 to 5 Mol% potassium hydroxide and/or potassium oxide. This mixture is to be operated at a relatively low temperature. Accordingly, with this reference there exists neither an electrolysis with anodic oxygen development and also only very generally there would be electrolysis and there would not be the problem of electrolytic yield mentioned at all and naturally also no showing or suggestion is included with this reference that the production yield with reference to the current can be increased or elevated in such an electrolysis by lithium ion addition.

The reference 19 58 359 (2) corresponds to U.S. Pat. No. 3,577,329 so that the content need not be repeated at this time.

British Pat. Nos. 802,483 (3) and 1,301,694 (4) also were brought forth. Of these references, the British Pat. No. 802,483 (3) discloses a dip-solder method for elements of aluminium-type material with which Lithium halogenides are to be added which not only reduce the melting or fusion point of the salt mixture but rather also have a desired influence upon the flow behavior of the solder alloy upon the aluminium surface. From the British reference 13 01 694 (4) there is apparent that the inorganic Lithium salt complexes or compounds with organic Lewis-basis are usable for diverse processes and are usable among other things also for electrochemical reactions. These British references however, provide no showing or suggestion whatever as to the features and improvements of the present invention.

The accompanying two graphs or curves emphasize the distinctions presented in the foregoing statements. The present inventive method accordingly is believed to have considerable inventive height.

The present invention includes the step of:
"maintaining the temperature of the melt at a temperature level well in excess of the fusion temperature of the melt;"
and also includes the ratio of sodium hydroxide to lithium hydroxide recited in the Example 1 as well as specifying a temperature level of approximately 400° C.

Shalit does not produce anodic oxygen. This is readily apparent in Col. 2, line 16. Note that the reaction at the anode is water "8 $H_2O$," not oxygen. Accordingly, the process of Shalit is quite different from that of the present invention. Although Shalit does disclose utilizing lithium hydroxide as a molten salt, the lithium hydroxide is utilized in a different process. Note that the lithium hydroxide is not specified as preferred and that it is recited as being a liquid which boils at above 600° C. Moreover, note that there is only one recitation of using lithium hydroxide and that in the examples, only sodium hydroxide and potassium hydroxide are disclosed. Accordingly, one skilled in the art would not derive from the teachings of Shalit that lithium hydroxide has any particular significance in a process that electrolyzes water to separate hydrogen and oxygen. Moreover, there is no disclosure in this patent of using lithium hydroxide to specifically increase the electrolytic of efficiency of a water electrolysis process.

U.S. Pat. No. 3,835,019 to Lovelock adds nothing to the Shalit teaching toward attaining the teaching of the present invention. Note that Lovelock does not produce a noted oxygen either. Rather, as is set forth in Col. 5, lines 18 and 19, protonic hydrogen (H+) is produced on the anode tube 34. This patent recites in Col. 5, lines 70-75 the following:

"... It is preferred to maintain an excess of hydrogen protons in the system at all times to prevent the formation of molecular oxygen which will cause bubbles in the electrolyte and excessive pressure on the thin wall electrotubes."

Clearly, the purpose of Lovelock is in accordance with the title thereof, i.e., a separator for electrolytic hydrogen gas. Moreover, in Lovelock, the lithium hydroxide is added to lower the temperature at which the electrolyte becomes molten, not to increase the efficiency of the system (Col. 5, lines 10-13). In addition, in Col. 5, lines 1-5, Lovelock recites that lithium "lowers the power requirement". According to the present invention there has been found that lithium requires a particular system which produces a noted oxygen to consume more power but results in a greater production of hydrogen and oxygen. Finally, the present inventive process works at a temperature well in excess of the fusion temperature of the melt. Note that Lovelock recites a temperature of 200° C. whereas the present invention involves a temperature of 400° C.

U.S. Pat. No. 3,173,849 to Shearer et al discloses utilizing lithium ions; however, lithium hydroxide is not used; rather Shearer et al teaches utilizing salts of lithium such as lithium carbonate, or lithium halides and borates. In addition, Shearer et al does not teach the concept of obtaining oxygen from a melt fusion type process.

The present invention is, of course, in no way restricted to the specific disclosure of the specification and examples, but also encompasses any modifications within the scope of the appended claims.

What we claim is:

1. A method of increasing the electrolytic efficiency of a melt fusion electrolysis in hydroxide containing melt including particularly water electrolysis, with which an anodic oxygen generation and separation occurs, said method including in combination the steps of:
   providing a fusion electrolyte; and
   adding of additional lithium ions to said fusion electrolyte for improved hydrogen yield of an alkaline fusion electrolysis through addition of the lithium ions which in themselves lead to an increase of cell voltage with equal or constant current density initially considered disadvantageous though contributing to gaining or concentration of oxygen and hydrogen as an energy carrier under greatest possible economical conditions.

2. A method in combination according to claim 1, which includes the step of said additional lithium ions in the form of a lithium compound selected from the group consisting of hydroxide, fluoride, sulfate, and carbonate.

3. A method in combination according to claim 2, which includes the step of said adding of said lithium compound in an amount corresponding to at least 15 Mol% of said melt.

4. A method in combination according to claim 3, which includes the step of forming a lithium hydroxide-containing alkali hydroxide melt.

5. A method in combination according to claim 4, which includes the step of forming a lithium hydroxide/sodium hydroxide melt.

6. A method of increasing the electrolytic efficiency of a melt fusion, water electrolysis process wherein hydroxide ions are included in the melt and wherein anodic oxygen is generated and separated from hydrogen, the method comprising the steps of:

providing a fusion electrolyte melt including sodium hydroxide;

adding lithium hydroxide to the fusion electrolyte for improved hydrogen yield of an alkaline fusion electrolysis through addition of the lithium ions which in themselves lead to an increase of cell voltage with equal or constant current density initially considered disadvantageous though contributing to gaining or concentration of oxygen and hydrogen as an energy carrier under greatest possible economical conditions; and maintaining the temperature of the melt at a temperature level well in excess of the fusion temperature of the melt.

7. The method of claim 6 wherein the lithium compound is included in an amount corresponding to at least 15 Mol % of said melt.

8. The method of claim 6 wherein the ratio of the sodium hydroxide to lithium hydroxide is 1:1.

9. The method of claim 8 wherein the temperature level is approximately 400° C.

* * * * *